Patented Oct. 11, 1932

1,881,498

UNITED STATES PATENT OFFICE

ROBERT J. GOODRICH AND IVAN GUBELMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

ISOLATION OF PURE ALPHA-ANTHRAQUINONE-MONOSULPHONIC ACID

No Drawing. Application filed July 9, 1930. Serial No. 466,879.

This invention relates to the preparation of pure anthraquinone-alpha-sulphonic acid and more particularly to a process for isolating anthraquinone-alpha-monosulphonic acid in a substantially pure state from a reaction mass obtained by sulphonating anthraquinone in the presence of mercury compounds.

As is well known the direct sulphonation of anthraquinone with oleum produces mainly anthraquinone-beta-sulphonic acids. However, by adding mercury compounds to the reaction mixture, a predominance of alpha-sulphonic acids results from the sulphonation. These alpha-sulphonic acids are mono- or di-sulphonic acids, depending upon the specific conditions under which the reaction is carried out, such as, the strength of the oleum or the temperature of the reaction. In any event the alpha-acid formed is contaminated with various other anthraquinone sulphonic acids. For instance, if the alpha-monosulphonic acid is produced it will invariably contain varying quantities of anthraquinone-alpha-disulphonic acids and the anthraquinone-beta-monosulphonic acid.

Several methods have heretofore been proposed for the recovery or isolation of anthraquinone-alpha-sulphonic acid in substantially pure form from the reaction mixture in which it is produced. One of the earliest methods is disclosed in U. S. Patent No. 743,664, and involves the salting out of the reaction mass by means of potassium chloride. The British Patent No. 10,242, of 1903, on the other hand refers to the low solubility of the potassium and calcium salts of anthraquinone-alpha-monosulphonic acid and impliedly indicates that the acid may be isolated by converting it into its calcium salts (see Example 2 of this patent). The U. S. Patent No. 1,260,535 proposes to separate anthraquinone-monosulphonic acids (either alpha or beta) from anthraquinone-disulphonic acids by adding sodium sulphate to a mixture of these acids. In all these cases, however, the alpha-monosulphonic acid obtained is not quite pure, but contains a considerable percentage of impurities, sometimes as high as 6%, of which the anthraquinone-beta-monosulphonic acid forms the major part.

It is accordingly an object of this invention to provide a method of separating substantially pure anthraquinone-alpha-monosulphonic acid from a mixture of this acid and anthraquinone-beta-monosulphonic acid.

It is a further important object of this invention to provide a process for separating substantially pure anthraquinone-alpha-monosulphonic acid from a reaction mixture obtained by sulphonating anthraquinone in the presence of mercury compounds.

Other and further important objects of this invention will become apparent from the following description and appended claims.

We have now found that by diluting a sulphonation mass containing a mixture of anthraquinone-alpha- and anthraquinone-beta-monosulphonic acid to regulate the acidity of the mixture and the concentration of the sulphonic acids therein and then adding a definite concentration of a sodium salt to the mixture maintained within a controlled temperature range, the sodium salt of the alpha-mono-acid precipitates in substantially pure form and is readily recovered by filtration.

Specifically, our process consists in diluting a sulphonation mass which has been obtained by sulphonating anthraquinone in the presence of mercury salts and which has been treated to eliminate any unchanged anthraquinone in the usual manner, to a point where the total concentration of monosulphonic acids in the mixture is less than 10% by weight. Sufficient sodium ions are then introduced by adding sodium hydroxide or a soluble sodium salt to the mixture, to just precipitate all the alpha-monosulphonic acid without precipitating any of the beta isomers. The required quantity of sodium ions can be predetermined by trial or may be determined during the course of addition of the sodium compound by taking samples of the precipitation mass and subjecting the same to analysis. Generally, the sodium ion concentration required will depend upon the acidity and temperature of the reaction mass. In our preferred method of operation the reaction mass is maintained at a temperature of between 20 and 30° centigrade and has an acidity equivalent to about 4 to 8% concentration of sulphuric acid. Under these conditions, the necessary concentration of sodium ions is equivalent to that of about 1.5% by weight of sodium carbonate.

The requisite sodium ion concentration may be obtained by employing sodium hydroxide, carbonate, chloride, sulphate, bisulphate or any other sodium salt which does not react chemically with the anthraquinone sulphonic acids other than to form the sodium salt of the acids. The proper amount of the particular salt employed may be added to the reaction mixture all at once or may be dissolved in an aqueous solvent and gradually stirred into the mixture.

The beta-monosulphonic acid remains in the mother liquor and may be recovered therefrom by adding to the liquor a further quantity of the sodium salt employed.

The following example in which parts by weight are given serves to more fully illustrate the nature of our invention.

*Example.*—A sulphonation mass obtained by sulphonating anthraquinone in the presence of mercury salts in the usual manner and containing 128 parts of anthraquinone-monosulphonic acid (alpha and beta), 40 parts of various anthraquinone-disulphonic acids, and some unchanged anthraquinone, sulphuric acid and mercury compounds, is diluted with water and freed from the precipitated unchanged anthraquinone according to conventional practice. The mixture is then further diluted with water to a total mass of about 3,000 parts by weight, whereby the concentration of the anthraquinone-monosulphonic acids in the mixture becomes equal to about 4.3% by weight. 44 parts of soda ash are now added and the mixture stirred at room temperature (22 to 25° centigrade) for about 10 hours. The mixture is then filtered and the resulting filter cake washed with its own volume of cold water. The filter cake contains 120 parts by weight of substantially pure sodium anthraquinone-alpha-monosulphonate and traces of sodium bisulphate and sulphuric acid.

The mother liquor which contains substantially all the anthraquinone-beta-monosulphonic acid as well as the various disulphonic acids, may if desired be treated with an additional quantity of 44 parts of soda ash to precipitate the sodium salts of the beta-monosulphonic acid which can then be recovered by filtration.

It is, of course, to be understood that various details of our process may be varied without departing from the spirit of our invention and accordingly we do not intend to be limited in the patent granted except as necessitated by the prior art and the appended claims.

We claim as our invention:

1. The process of isolating anthraquinone-alpha-monosulphonic acid from a reaction mass obtained by sulphonating anthraquinone in the presence of mercury compounds and freed from any unchanged anthraquinone which comprises diluting the reaction mass with water to decrease the concentration of the total anthraquinone-monosulphonic acids therein below 10%, and forming in the diluted mass a concentration of sodium ions just sufficient to precipitate substantially all of the anthraquinone-alpha-monosulphonic acid in the form of its sodium salt, without precipitating any of the beta-isomer.

2. The process of isolating substantially pure anthraquinone-alpha-monosulphonic acid from a reaction mass obtained by sulphonating anthraquinone in the presence of mercury compounds and freed from any unchanged anthraquinone which comprises diluting the mass with water to decrease the concentration of the total anthraquinone-monosulphonic acids therein to about 4 to 10% and adding a quantity of an ionizable sodium compound, just sufficient to precipitate substantially all the anthraquinone-alpha-monosulphonic acid in the form of its sodium salt, without precipitating any of the beta-isomer.

3. The process of isolating substantially pure anthraquinone-alpha-monosulphonic acid from a reaction mass obtained by sulphonating anthraquinone in the presence of mercury compounds and freed from any unchanged anthraquinone which comprises diluting the mass with water to decrease the concentration of the total anthraquinone-monosulphonic acids to about 4 to 10%, and adding a quantity of sodium carbonate, just sufficient to precipitate substantially all the anthraquinone-alpha-monosulphonic acid in the form of its sodium salt, without precipitating any of the beta-isomer.

4. The process of isolating anthraquinone-alpha-monosulphonic acid from a mixture of anthraquinone-alpha-and beta-monosulphonic acids containing these acids in a ratio not higher than 100:6, which comprises diluting an acid solution of the mixture to a point wherein the total concentration of the alpha- and beta-isomers is less than 10% by weight, and effecting in the diluted mass a concentration of sodium ions just sufficient to precipitate substantially all of the anthraquinone-alpha-monosulphonic acid in the form of its sodium salt, without precipitating any of the beta-isomer.

5. The process of isolating anthraquinone-alpha-monosulphonic acid from a mixture of anthraquinone-alpha- and beta-monosulphonic acids containing these acids in a ratio not higher than 100:6, which comprises diluting an acid solution of the mixture to a point wherein the total concentration of the alpha- and beta-isomers is about 4 to 10%, and adding to the mixture a quantity of an ionizable sodium compound, just sufficient to precipitate substantially all the anthraquinone-alpha-monosulphonic acid in the form of its sodium salt, without precipitating any of the beta-isomer.

6. The process of isolating anthraquinone-alpha-monosulphonic acid from a mixture of anthraquinone-alpha- and beta-monosulphonic acids containing these acids in a ratio not higher than 100:6, which comprises diluting an acid solution of the mixture to a point wherein the total concentration of the alpha- and beta-isomers is about 4 to 10%, and adding a quantity of sodium carbonate, just sufficient to precipitate substantially all the anthraquinone alpha-monosulphonic acid in the form of its sodium salt, without precipitating any of the beta-isomer.

7. The process of isolating substantially pure anthraquinone-alpha-monosulphonic acid from a reaction mass obtained by sulphonating anthraquinone in the presence of mercury compounds and freed from any unchanged anthraquinone, which comprises diluting the mass with water to a point wherein the concentration of the total anthraquinone-monosulphonic acids is about 4 to 10%, adding to the diluted mass a quantity of an ionizable sodium compound, sufficient to effect a sodium ion concentration equivalent to that of about 1.5% of sodium carbonate to thereby precipitate the alpha acid in the form of its sodium salt and filtering off the precipitated sodium salt.

8. The process of isolating substantially pure anthraquinone-alpha-monosulphonic acid from a reaction mass obtained by sulphonating anthraquinone in the presence of mercury salts and freed from any unchanged anthraquinone, which comprises diluting the mass with water to reduce its total acidity to a concentration equivalent to a concentration of 4 to 8% sulphuric acid and adding to the diluted mass a quantity of an ionizable sodium compound just sufficient to precipitate substantially all the anthraquinone-alpha-monosulphonic acid in the form of its sodium salt, without precipitating any of the beta-isomer.

9. The process of isolating substantially pure anthraquinone-alpha-monosulphonic acid from a reaction mass obtained by sulphonating anthraquinone in the presence of mercury compounds and freed from any unchanged anthraquinone, which comprises diluting the mass with water to reduce the total acidity to a concentration equivalent to a 4 to 8% concentration of sulphuric acid and the total concentration of monosulphonic acids to about 4 to 10%, adding to the diluted mass a quantity of an ionizable sodium compound, sufficient to effect a sodium ion concentration equivalent to that of about 1.5% sodium carbonate to thereby precipitate the alpha acid in the form of its sodium salt and filtering off the precipitated sodium salt.

In testimony whereof, we have hereunto subscribed our names at Carrollville, Milwaukee county, Wisconsin.

ROBERT J. GOODRICH.
IVAN GUBELMANN.